Jan. 27, 1970     W. HOLZER     3,491,546
METHOD OF REGULATING THE TEMPERATURE OF REFRIGERATORS
Filed Oct. 25, 1967     3 Sheets-Sheet 1
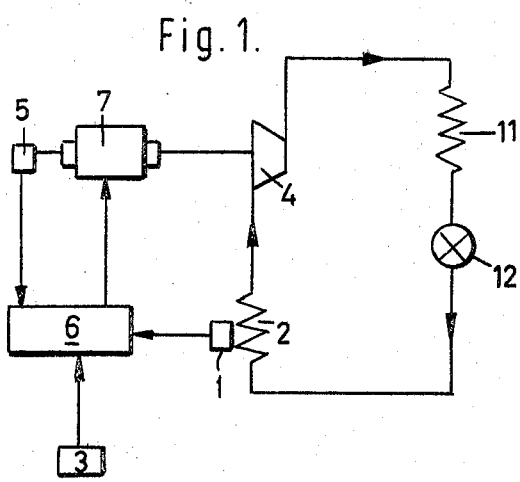
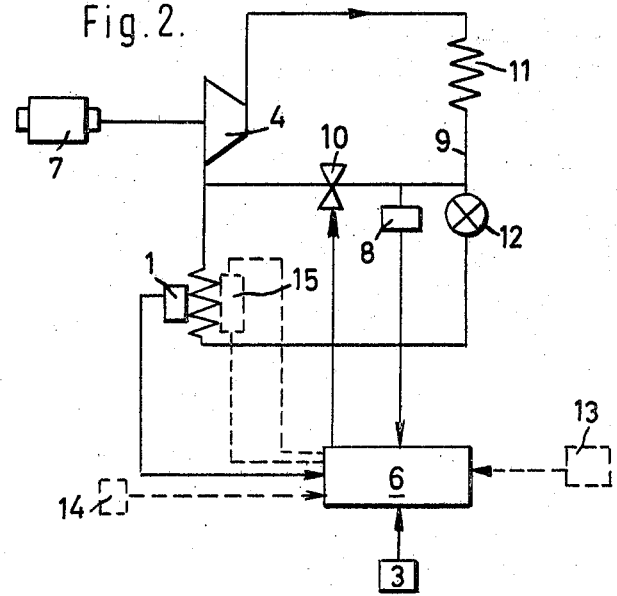

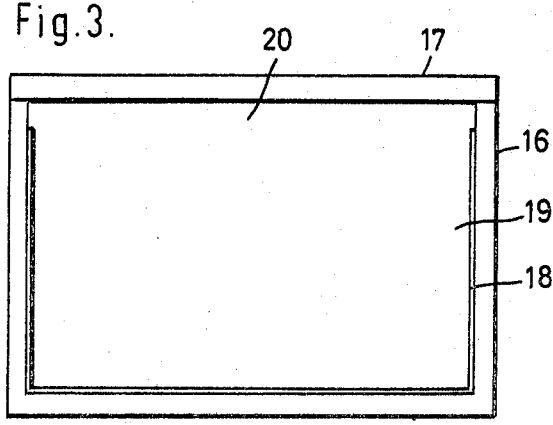
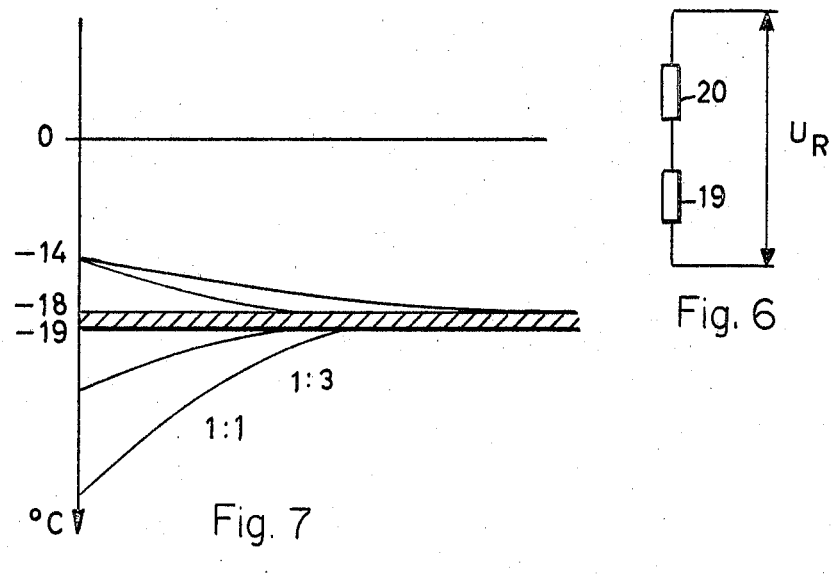

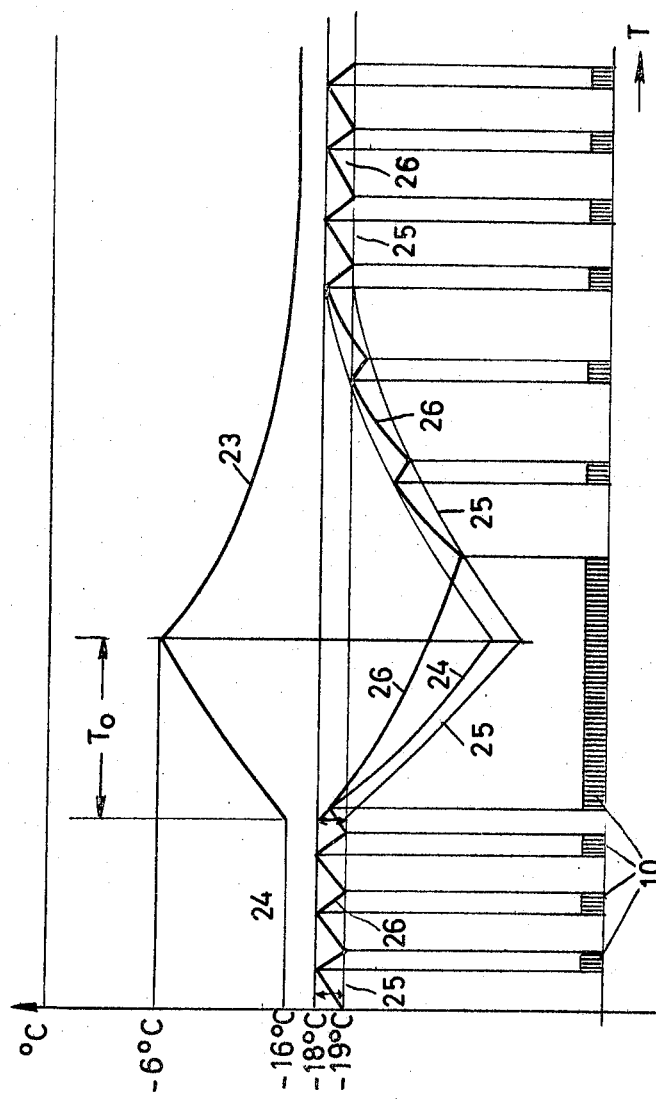

United States Patent Office 3,491,546
Patented Jan. 27, 1970

3,491,546
METHOD OF REGULATING THE TEMPERATURE OF REFRIGERATORS
Walter Holzer, Drosteweg 19, Meersburg (Bodensee), Germany
Filed Oct. 25, 1967, Ser. No. 678,010
Claims priority, application Germany, Oct. 26, 1966, H 60,871; Apr. 21, 1967, H 62,497
Int. Cl. F25b *1/00, 49/00*
U.S. Cl. 62—115            9 Claims

ABSTRACT OF THE DISCLOSURE

This invention relates to a method or regulating the temperature of refrigerating equipment and has for one of its objectives frost control. This is achieved because the cold output is here regulated by an electronic analogue value control according to a variable temperature setting, a continuously measured actual temperature and a measurement value which is an analogue of the amount of cold produced. Constant temperature is also maintained when the refrigerator door is opened by automatically shifting the response value of temperature control to a temperature value that is substantially lower than normal operation.

BACKGROUND

The invention relates to a method of regulating the temperature of refrigerating equipment, and in particular to the regulation of refrigerators, deep freezers and cold rooms.

Refrigerators have hitherto made almost exclusive use of thermostats, which switch the refrigerator on at a given temperature and switch the refrigerating unit off again once another given temperature has been reached. The sensor is usually installed in the cooling space in a position where it can record mean temperature values and frequently where it has particularly critical conditions for temperature measurement.

For an adequate supply of cold, the difference between the switch-on and switch-off temperatures must not be too small. It is a particularly unfavorable fact that the time constant of the equipment between the refrigerating process and the thermostat response produces very large temperature differences in the evaporator, because the refrigerating unit goes on working at full output until the requisite temperature has been reached at the thermostat measuring point.

Since, with normal refrigerators, a temperature of about +2° C. to +10° C. in the cooling space can be preset, the temperature at the evaporator often lies at −10° C. to −20° C. or even below. This accounts for the familiar icing up of the evaporator since the atmospheric moisture condensed on it freezes, with the well-known undesirable results. Special defrosting procedure is required, to keep the cooling system in working order.

With refrigerating equipment of the kind mentioned, such as used hitherto, the refrigerating unit is switched on and off by a thermostat that measures the temperature directly from the evaporator or at least from its immediate vicinity. This certainly gives sufficient accuracy for practical requirements, since the unit, in the temperature range between −18° C. and −19° C., regulates the evaporator temperature, so that this refrigeration temperature is kept stable, but at the same time it should not be overlooked that the drawback of such regulation lies primarily in the fact that when the door or lid is opened for the insertion of goods for cooling, the subsequent lowering of the inside temperature takes place somewhat slowly, since it is only the temperature drop that acts as the magnitude affecting the control circuit. This temperature drop is given by the difference between the temperature prevailing as a result of the opening of the door or lid and the upper response value of −18° C. of the control circuit.

SUMMARY

The purpose of the invention is to provide a refrigerator in which no special measures are necessary for defrosting the equipment. This purpose it achieves because the cold output is here regulated by an electronic analogue value control according to a variable temperature setting, a continuously measured actual temperature and a measurement value which is an analogue of the amount of cold produced.

Another purpose of the invention is, with a refrigerator of this kind, to maintain as constant a temperature as possible in the cooling space or evaporator space, even after the opening of the door or lid. This further purpose is achieved by virtue of the fact that, when the door or lid of the room or cabinet is opened, the response value of the temperature control is automatically shifted to a temperature value that is lower as compared to steady operation.

Achievement of the first purpose mentioned is made possible by continuously regulated operation of the refrigerating unit. For this purpose, it is possible to control not only the pressure in the moisture condensation system, but also (especially in compression refrigerator equipment) the rotation speed of the compressor.

DESCRIPTION OF DRAWINGS

The accompanying drawings show one practical example of the object of the invention wherein:
FIGURE 1 shows an arrangement with the compressor motor subject to speed regulation.
FIGURE 2 is a diagram of an arrangement whereby the pressure in the evaporator system is varied.
Both of these drawings relate to achievement of the first purpose of the invention, while the succeeding drawings, FIGURES 3 to 5, show one possible solution of the second problem.
FIGURE 3 shows a deep-freeze cabinet diagrammatically in section.
FIGURE 4 shows the temperature sensor circuit.
FIGURE 5 is a diagram of time-temperature relations.
FIGURE 6 shows an arrangement of temperature sensors.
FIGURE 7 is another diagram of time-temperature relations.

PREFERRED EMBODIMENTS

In the design shown in FIGURE 1, compressor 4 is driven by motor 7 and discharges cooling liquid into condenser 11 through valve 12 and evaporator 2. The coolant returns from evaporator 2 to compressor 4 to start another cycle. Speed gauge (tachometer) 5 measures the rotation speed of motor 7 and converts it into an electronic analogue value which is transmitted to electronic control 6 by way of a connecting lead. The rotation speed of motor 7 represents a measure of the coolant pumped through evaporator 2. The cooling temperature of evaporator 2 is measured by sensor 1 and is converted simultaneously into an electronic analogue value which is fed to electronic control 6 through a connecting lead. The electronic analogue value may very well be an electric resistor, a voltage or an amperage. The desired temperature is set at temperature controller 3 by means of an electronic analogue value such as a resistor. The electronic analogue values of speed gauge 5, of sensor 1 and of temperature controller 3 are compared with each other by electronic controller 6. According to the results of this comparison, the rotation speed of motor 7 will be raised, lowered or maintained by way of the connecting lead between electronic controller 6 and motor 7. An increase in rotation speed of motor 7 produces an increase in cooling capacity, i.e., in coolant flow to evaporator 2. A decrease in rotation speed of motor 7 produces a decrease in coolant flow to evaporator 2.

In the design of FIGURE 2, motor 7 runs independently of electronic controller 6 with a constant rotation speed and drives a constant quantity through condenser 11. The quantity of coolant which flows through evaporator 2 is regulated by bypass valve 10. Bypass valve 10 and pressure gauge 8 regulate the coolant quantity required for evaporator 2. Pressure gauge 8 measures compression of coolant within the bypass line and feeds it to electronic controller 6. If a comparison of these electronic analogue values results in a definite differential value, electronic controller 6 will send a regulating signal to bypass valve 10 in accordance with the amount of the differential. This regulating signal adjusts bypass valve 10 and according to requirements alters flow through bypass valve 10 and also the supply of coolant to evaporator 2. In addition to sensor 1, FIGURE 2 calls for a second temperature sensor 14 which measures the cooling space temperature and causes an electronic analogue value corresponding to the measurement. The last-mentioned electronic analogue value is also transmitted to electronic controller 6. The coolant quantity requirement can be regulated either in relation to the temperature measured by sensor 1 or in relation to the temperature measured by sensor 14.

Particularly favorable conditions are obtained when temperature measuring sensor 1 is placed directly at evaporator 2 (FIGURE 1). By direct control aimed at a steady temperature, the surface of evaporator 2 can be kept, for example, at a constant +2° C. This, however, completely excludes icing-up, since evaporator 2 is never chilled below freezing. Withdrawn cold is immediately taken under control to evaporator 2. The temperature sensor can even be fitted on outside of the evaporator 2, the walls of which are good heat conductors. This may yield further advantages, since all control components are placed outside the cooling space.

For analogue value regulations, use is made, for example of a temperature-sensitive electrical resistor (thermistor), which is situated within the temperature sensor 1 and gives rise to an analogue voltage $U_T$ equivalent to the measured temperature on a voltage divider. This voltage is compared with a desired-value voltage $U_S$, which is set by hand by means of controller 3 analogous to the temperature desired in the refrigerator cabinet. The difference between the two voltages $U_S-U_T$ serves as the control magnitude for the cold output to be supplied.

Compressor 4, the speed of rotation of which is controlled, has a speed gauge (tachometer) 5 which provides the actual electronic control 6 with a reference voltage $U_N$, which is an analogue of the speed of rotation N. It is immaterial whether this tachometer voltage be directly generated or derived indirectly from the frequency.

For each voltage difference $U_S-U_T$, there is a corresponding correct compressor speed, the value of which is based on experience. As a practical example, the following might be chosen:

Example 1

For $U_S-U_T=0$, that is to say upon the desired temperature being reached, the compressor should run at only 50% of the full speed, giving rather less than the amount of cold which arises in any case as a loss.

Example 2

For $U_S-U_T=1$ volt; however, the compressor should be giving 100% of the full amount of cold, the thermistor with its voltage divider being so arranged that $U_S-U_T=1$ volt arises even for a temperature rise of 1 deg. C. In other words, even a temperature rise of 1 deg. C. should result in regulating the compressor speed from 50% to 100%.

In accordance with this example, the tachometer reference voltage $U_N$ should be so arranged that the voltage $U_N$ rises by 1 volt when there is a speed rise from 50% to 100%.

Actual speed regulation is brought about by (for example) full power being fed to motor 7 of compressor 4 for so long as $U_N$ is smaller than $U_S-U_T$. The cooling process begins. As soon as $U_S-U_T$ reaches 1 volt, as in the example, so that it corresponds to the value of $U_N$ for 100% speed, the actual regulation process starts. As soon as $U_S-U_T$ falls below the value $U_N$, the current feed to motor 7 is temporarily cut, so that the speed and hence $U_N$ falls, until $U_N$ is smaller than $U_S-U_T$. The compressor motor is then switched on again in the conventional manner in a control circuit, either at a lower speed than corresponds to $U_S-U_T$ or by time control after a brief interval. The speed thus increases, full power being supplied once more to the motor in consequence of the condition $U_N<U_S-U_T$, until $U_N$ reaches the value $U_S-U_T$, which again results in temporarily cutting off the current supply from the motor, and so forth.

As long as the cold output produced is greater than the cold losses and/or cold consumption, $U_S-U_T$ will continue to fall and the alternation of continual reduction of the compressor speed or of $U_N$ will proceed until a further temperature drop no longer occurs. According to this example, the desired temperature setting is achieved with a maximum deviation of 1 deg. C. The maximum deviation of 1 deg. C. results from the fact that a rise in temperature of 1 deg. C. should cover the full range of regulation from 50% to 100%.

For design of the analogue value regulation in accordance with the invention, it is immaterial which range of speeds (even as far as "nil" cold output) or which temperature tolerances be chosen, since these values are determined to a large extent by the refrigerator cabinet itself and by the various components. Nor does it matter what kind of electronic speed regulation be employed, so long as the alternation of tachometer voltage $U_N$ and temperature difference voltage $U_S-U_T$ is maintained.

Similar considerations apply to the regulation of the cold output over the compression and/or condensation range. FIGURE 2 may serve as a practical example. Instead of the tachometer 5 a pressure gauge 8 is provided in the compressor part 9 which, according to the compression pressure, supplies an analogue voltage $U_N$ to the control for comparison with $U_S-U_T$. This time, however, the control acts not on motor 5 of compressor 4, but (for instance) on a bypass valve 10 which reduces the compression and hence the cold output until the state of equilibrium is reached in which $U_N=U_S-U_T$. As shown in FIGURE 2, bypass valve 10 is located in a bypass line which connects condenser 11 directly with the inlet line of compressor 4. The purpose of bypass valve 10 is to increase or decrease the flow of coolant through evaporator 2. Between bypass valve 10 and electronic control 6 is an electric lead which regulates bypass valve 10; therefore, bypass valve 10 must be an electromagnetic actuated or controlled valve. Bypass valve 10 may be impulsed-controlled with the number and duration of the impulses being controlled by regulator 6 in terms of $U_N$ or a combination of $U_N$ and time. Numerous control circuits exist for this purpose.

In FIGURES 1 and 2, corresponding parts are numbered alike. In addition to the parts already mentioned, condenser 11 and reducing valve 12 are shown in the drawings. In putting the invention into practice, it is desirable to provide, in addition to the evaporator, which is temperature-controlled above freezing, at least one condenser for a lower temperature range, to serve for the production of ice cubes or deep freezing.

It is also possible to combine both methods in large installations and to regulate both the motor speed and the pressure, particularly when several evaporators are provided and various temperature zones are desired.

It is also advisable to have as large as possible an evaporator surface in the normal zone of refrigeration to afford a good heat exchange. This is all the more readily attainable because the usual objections about icing no longer apply.

Another use for analogue value regulation, in the case of refrigerators operating within the frost zone in the customary way, with a sensor fitted in the cooling space, is to set the desired temperature under time control once every 24 hours, or so, to a setting a few degrees above freezing, with a second sensor taking the temperature directly from the evaporator. This ensures that, despite the defrosting procedure, the cooling space temperature will not rise above a value that presents a threat to the goods being refrigerated. This method of defrosting can be combined with any of the usual heating processes employing, for example, electricity or hot gas.

In FIGURE 2, the basic elements required when defrosting is applied are indicated in broken line. Time switch therefor (clock) 13 controls the timing of the defrosting process by a change over to a higher temperature setting, changing over from the cooling-space temperature sensor 14 to the temperature sensor on the evaporator. At the same time, for example, an electric heater 15 can also be switched in. Heater 15 here may be regulated in the same way as the motor speed, by controlled continually intermittent power impulses. Time switch 13 can be a normal commercial electric timer which operates at intervals of 24 hours or at any other desired time interval. Time switch 13 sends its signals to electronic control 6 which in turn activates heater 15 for the duration of a given timer setting. The heating devices here contemplated are widely known and may for example comprise an electric resistor mounted nearby evaporator 2 to heat the evaporator in such a manner that surface ice defrosts.

The advantage to be gained from the indicated solution to the second problem envisaged is clear, because by lowering the response value the regulator is given a very high disturbance value which results in a correspondingly rapid and intense reaction so that conditions of fixed working can be attained within a relatively short space of time. One advantageous factor is that a small rise in temperature in relation to the desired value in the interior of the cabinet or the like results in lowering the evaporator temperature by several times the temperature rise so that the interior of the cabinet is cooled very rapidly.

As described hereunder with reference to FIGURES 3 to 5, the sensors employed may with advantage take the form of temperature-sensitive resistor elements, these sensors having different temperature coefficients and the temperature coefficient of the sensor that measures the interior temperature being higher than that of the sensor that measures the evaporator temperature, so that in this way ready adaptation over a wide range to the conditions present at any given moment is possible by simple means and regulation can be carried out very accurately with an electronic thermostat.

Experience has shown a temperature coefficient ratio of about 1:3 to be suitable, that is to say that the temperature coefficient of the sensor for the interior temperature is about three times as high as that of the sensor at the evaporator, so that a trifling temperature change of approximately 4 deg. C. within the deep-freeze brings about three times as great a temperature change at the evaporator, so as to balance the change in the response value once more. If, for example, the lid of a deep-freeze cabinet be opened to enable goods to be put therein, warm air enters the cabinet and raises the interior temperature by about 4 deg. C. If the temperature coefficients of the sensor resistors stand in the ratio of 1:3, the response threshold of −18° C. is dropped 12 degrees C., i.e., to −30° C. Obviously, such a drop in response value, from −18° C. to −30° C., results in far quicker cooling of the goods put in than if the regulation system were operated at a constant response level of −18° C.

The deep-freeze cabinet (shown in FIGURE 3) conventionally consists of a box-like basic body, 16, closed at the top by a lid 17. In the vicinity of the inner wall of the body 16 lies evaporator 18. A measuring sensor at 19 measures the temperature of the evaporator or of its immediate vicinity. A measurement sensor at 20 measures the temperature within the actual cooling space. As shown by FIGURE 4 in the form of a block circuit diagram, both measuring sensors 19 and 20, which take the form of temperature-sensitive ohmic resistances, are joined in series with the measuring resistor 21 as a voltage divider and form the input of a threshold-value amplifier 22. Amplifier 22 switches the refrigerating unit (not shown, being familiar enough) off and on, according to the measurement values given by sensors 19 and 20. This threshold-value amplifier 22 has an adjustable switching threshold (switching spindle), and when the upper switching threshold value is reached (in the present example at −18° C.) the compressor is switched on and when the lower switching threshold value is reached (−19° C.) the compressor is switched off.

FIGURE 5 shows in diagram form the mode of operation of the equipment, the abscissae representing time T and the ordinates the temperature in deg. C. The line 23 shows the temperature variation within the actual cooling space, the temperature of which is measured by the sensor 20. During the period $T_0$, the lid of the refrigerator cabinet has been opened. The lines 24 and 25 represent the upper and lower switching threshold temperatures (−18° C. and −19° C.), at which the compressor is switched off and on. Between the two lines 24 and 25 runs the temperature curve 26 of the evaporator, the temperature of which is measured by the measuring sensor 19. The time intervals during which the evaporator is in operation are shown by 27. In the left-hand portion of the diagram, steady working of the refrigerator cabinet is represented. The interior temperature (line 23), which is measured by sensor 20, is practically constant, this being achived by the repeated switching on and off of the evaporator. The actual evaporator temperature 26 varies at the same time between the two regulation limit values of −18° C. and −19° C. If, now, the lid of the cabinet be opened (period $T_0$), warm air enters the interior and the temperature 23 measured by sensor 20 rises. This, however, causes the switch-on and switch-off threshold of the threshold-value amplifier to be lowered. Thus, if the cooling at the evaporator, as shown in the curve 26, cannot follow the rapid fall in the line 24, the refrigerating unit will remain switched on until the temperature line 26 of the evaporator subsequently cuts across the lower switch-off threshold. Not until then does the switching on and off between the two control temperatures of −18° C. and −19° C. recommence. As a result of the lowering of the evaporator temperature, the desired rapid cooling is achieved. The particular advantage of this arrangement lies, however, not only in the fact that the chilling of freshly introduced goods is rapid, but also in the fact that a very close and precise control tolerance is nevertheless ensured in the steady condition. In other words, in the steady condition, the switching offers the advantage of great accuracy with close tolerances, and in the event of disturbance, when the lid is opened a marked drop in temperature and hence very rapid cooling are ensured.

Obviously, the method described in the foregoing and the equipment for applying that method can be used advantageously not only for deep freezers, but also for refrigerating equipment of all kinds, such as cold rooms or refrigerator cabinets.

What I claim is:

1. In a refrigerator with a refrigerator space and having an electric motor-driven compressor operatively connected to circulate a suitable coolant through a condenser a reducing valve and an evaporator, a method for regulating the temperature of said refrigerator space by controlling the supply of coolant to the evaporator and comprising the steps of
- continuously measuring the actual temperature of the refrigerator space and converting it into an electronic analogue actual-temperature value,
- selecting a nominal temperature and converting it into an electronic analogue nominal-temperature value,
- measuring the instantaneous flow rate of the coolant and converting it into an electronic analogue flow value,
- comparing said actual-temperature value with said nominal-temperature value to establish a differential value therebetween,
- comparing the differential value with said flow value and regulating said instantaneous flow rate of the coolant in relation thereto.

2. The method of claim 1 with the measurement of the instantaneous flow rate of the coolant taken as the speed of rotation of the compressor.

3. The method of claim 1 with the measurement of the instantaneous flow rate of the coolant taken as the pressure in a compression part of the refrigerator.

4. The method of claim 1 with the measurement of the instantaneous flow rate of the coolant taken as the pressure in the condenser.

5. The method of claim 1 with the actual temperature being measured directly from the evaporator.

6. The method of claim 1 with the actual temperature being above freezing and measured from the evaporator.

7. In a refrigerator, with a refrigerator space and a door communicating therewith, a refrigerating unit operably connected to cool said refrigerator space, and provided with a control system for controlling the refrigerating unit including a means for reducing the effort of the refrigerating unit at a presettable response value, a method for regulating the temperature of said refrigerator space when said door is opened and comprising the steps of
- presetting said response value,
- providing means responsive to opening said door for lowering said response value substantially below said preset response value.

8. The method of claim 7 and
- arranging said means responsive to opening said door to be responsive to the temperature of said refrigerator space,
- arranging a temperature as said responsive value,
- magnifying the raise in temperature of said refrigerator space to determine the amount by which said response value of temperature is lowered.

9. In a refrigerator with a refrigerator space and having an electric-motor-driven compressor operatively connected to circulate a suitable coolant through a condenser a reducing valve and an evaporator, a method for regulating the temperature of said refrigerator space by controlling the supply of coolant supplied to the evaporator and comprising the steps of
- continuously measuring said actual temperature at two locations of the refrigerator space using temperature-sensitive ohmic resistances joined in series with a measuring resistance as a voltage divider and forming input of a threshold-value amplifier,
- regulating the instantaneous flow rate of the coolant to said evaporator by means of the threshold amplifier.

References Cited

UNITED STATES PATENTS

| | | | |
|---|---|---|---|
| 3,010,289 | 11/1961 | Kuklinski | 62—215 |
| 3,355,906 | 12/1967 | Newton | 62—228 |
| 3,363,429 | 1/1968 | Wechsler et al. | 62—228 |

LLOYD L. KING, Primary Examiner

U.S. Cl. X.R.

62—215, 227, 230